US006966415B1

(12) United States Patent
Conrad

(10) Patent No.: US 6,966,415 B1
(45) Date of Patent: Nov. 22, 2005

(54) ROLLABLE SUPPORT FOR A CEMENT-POURING CHUTE

(76) Inventor: Dennis Conrad, 11800 White Pine Hwy., Morenci, MI (US) 49256

( * ) Notice: Subject to any disclaimer, the term of this patent is extended or adjusted under 35 U.S.C. 154(b) by 0 days.

(21) Appl. No.: 10/853,882

(22) Filed: May 26, 2004

(51) Int. Cl.[7] ............................................. B65G 11/14
(52) U.S. Cl. .......................... 193/10; 198/311; 366/68
(58) Field of Search .................. 193/4–6, 10; 198/300, 198/311; 366/68; 248/49, 65

(56) References Cited

U.S. PATENT DOCUMENTS

| 215,510 A | 5/1879 | Davis |
| 1,197,839 A | 9/1916 | McAnlis |
| 2,764,450 A * | 9/1956 | Rosener ........................... 298/7 |
| 3,246,884 A * | 4/1966 | Prichard et al. ............... 366/41 |
| 3,550,790 A * | 12/1970 | Nobel ...................... 414/745.5 |
| 3,583,168 A * | 6/1971 | Horton ........................ 405/179 |
| 3,767,149 A | 10/1973 | Hill |
| 4,624,357 A | 11/1986 | Oury et al. |
| 4,634,285 A | 1/1987 | Newberry |
| 5,178,252 A * | 1/1993 | Smith ............................. 193/5 |
| 5,871,306 A | 2/1999 | Tilcox |
| 6,401,901 B1 * | 6/2002 | Bracken et al. ............... 193/38 |
| D475,373 S | 6/2003 | Olsen et al. |

* cited by examiner

Primary Examiner—Eileen D. Lillis
Assistant Examiner—Mark A. Deuble
(74) Attorney, Agent, or Firm—Young & Basile, P.C.

(57) ABSTRACT

An apparatus for rollably supporting a cement-pouring chute having a support structure cooperatively engageable with a cement-pouring chute for supporting the chute and directing the pouring of cement therefrom. The support structure is angularly adjustable to allow for the angular adjustment of the cement-pouring chute. At least one roller assembly is connected to the support structure to provide a rollable adjustment to the support structure. The roller assembly may provide a pneumatic tire mounted on a caster and a bearing.

19 Claims, 2 Drawing Sheets

ROLLABLE SUPPORT FOR A CEMENT-POURING CHUTE

FIELD OF THE INVENTION

The present invention relates to an apparatus for supporting a cement-pouring chute, and more particularly, an apparatus for rollably supporting a cement-pouring chute that is adjustable and capable of rollably traversing a variety of uneven surfaces.

BACKGROUND OF THE INVENTION

Recent years have seen the development of improved techniques for pouring cement and concrete mixtures. In many construction trades, large commercial cement preparation companies are employed to premix and ship cement and concrete payloads from plants located some distance away from a construction or work site. In these situations, contractors employ the use of cement trucks for transporting the cement and concrete mixtures from the plant to the construction location. The timely delivery of cement payloads is often foundational to many building projects.

Such cement trucks have evolved into two primary forms. One form of cement truck is known as a rear-dispatch truck. Trucks of this type have a cement mixing bin oriented with its opening to the rear of the truck. The bin is designed to be able to empty its contents through a network of funnels, canals, chutes, or receptacles in order to ultimately deposit the payload in the desired location. In a common scenario, the cement is poured through a sectioned and extensible cement-pouring chute. Such a chute is generally disposed at a declining angle from the opening of the mixing bin, and the cement mixture is poured through it with the aid of gravity. In situations where a rear-dispatch truck is used to pour large slabs covering large, substantially horizontal areas, the truck is commonly backed up to a remote end or corner of the area to be filled, and the truck is slowly advanced as appropriate amounts of cement are deposited into the desired locations. Cement-pouring chutes affixed to rear-dispatch trucks often have no mechanism for directing or otherwise variably supporting the chute structure. Thus, it is often necessary to either utilize additional manpower for holding or orienting the cement-pouring chute or otherwise employ some support structure for guiding the cement-pouring chute to the appropriate locations.

A second type of cement truck of more recent origin is known as a front-dispatch truck: Such trucks are substantially similar to rear-dispatch trucks, with two notable exceptions. First, the cement-mixing bin is oriented to dispense cement from the front end of the truck. Second, the cement-pouring chute structure on front-dispatch trucks is often provided with hydraulic controls within the cab of the truck. This arrangement provides several benefits. Since the cement truck operator, when seated in the cab of the vehicle, is able to view the work site and control all of the truck's features, he is often able to improve the speed and efficiency of the cement-pouring process by anticipating the appropriate movements and locations for directing the poured cement mixture.

When using either type of truck, it is not uncommon for situations to arise in which, due to the nature of the work site or the particular slab to be poured, cement trucks may be unable to gain sufficient proximity to the area designated for the pour such that the full extended length of the truck is sufficient to spread the cement or concrete to all appropriate locations. In these situations, contractors often affix one or more extensions to the concrete-pouring chutes provided in the front-dispatch truck's design. In these cases, due to the weight of the wet cement traversing the chute and extensions, additional support is often needed along the span of the cement-pouring chute and extensions. Work site contractors often use conventional devices such as sawhorses to provide such support. Unfortunately, the use of sawhorses or other stationary supports negates the benefits inherent in the maneuverability of the front-dispatch truck design. In these situations, it is often necessary to interrupt the pour, clean and relocate the cement-pouring chute and extensions, and begin pouring again in a new location. Such cycling invariably extends the length of time required to complete the pouring operation. Similarly, when rear-dispatch trucks are used, additional chute support is often desirable.

It would be desirable to have a device capable of providing a rollable support to a cement-pouring chute or cement-pouring chute extension that would allow the maneuverability of an extended cement-pouring chute arrangement without interrupting the pour.

SUMMARY OF THE INVENTION

The present invention provides an apparatus for rollably supporting a cement-pouring chute comprising a support structure cooperatively engageable with a cement-pouring chute for supporting and directing the pouring of cement therefrom. At least one roller assembly is attached to the support structure. The roller assembly may include at least one pneumatic tire and may have one or more casters. The at least one roller assembly may have a bearing attached to the support structure, thereby allowing the roller assembly to swivel.

The support structure of the present invention may comprise a substantially horizontal support having a first end and a second end. First and second substantially vertical supports are respectively attached to the first and second ends of the horizontal support and extend upwardly therefrom. Substantially parallel first and second rails are respectively attached to the first and second vertical supports and are cooperatively engageable with a cement-pouring chute for directing the pouring of cement therefrom. At least one roller assembly is attached to the horizontal support. The horizontal support may be adjustable in length, and the first and second rails may be angularly adjustable. The first and second vertical supports may each have a handle and may be adjustable in height. The horizontal and vertical supports of the present invention may also define a plane, wherein the first and second rails may be oriented to intersect that plane.

BRIEF DESCRIPTION OF THE DRAWINGS

The description herein makes reference to the accompanying drawings wherein like referenced numerals refer to like parts throughout several views and wherein.

DESCRIPTION OF THE ILLUSTRATED EMBODIMENTS

Figure 1:
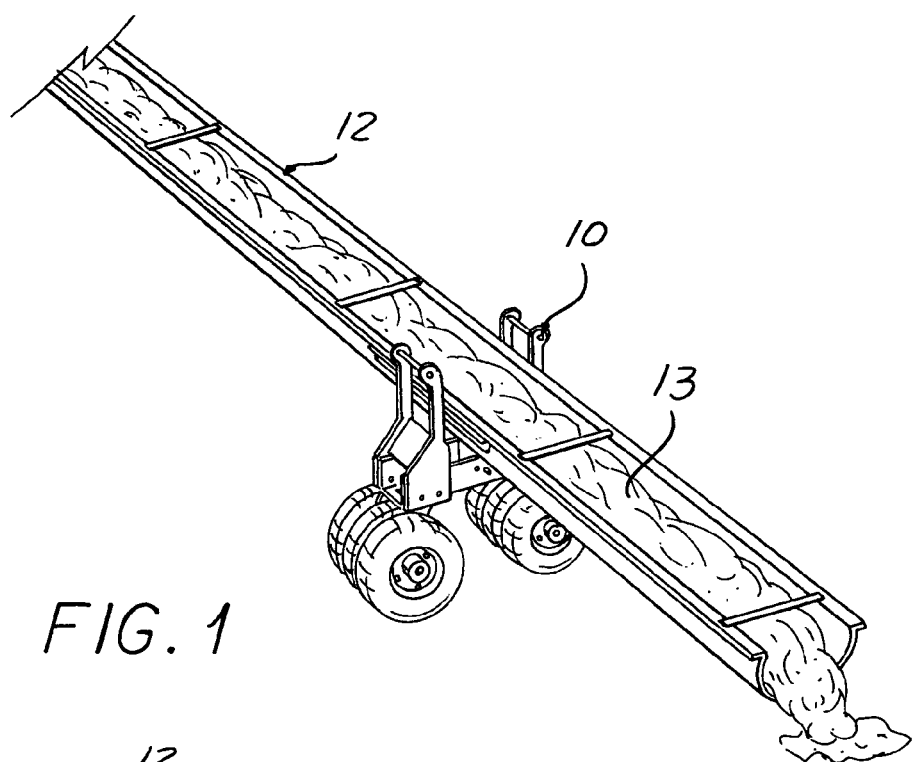
FIG. 1 is a perspective view of the rollable support for a cement-pouring chute of the present invention showing the present invention in use with a cement-pouring chute.

Referring to the drawings, the present invention will now be described in detail with reference to the disclosed embodiment.

Figure 2:
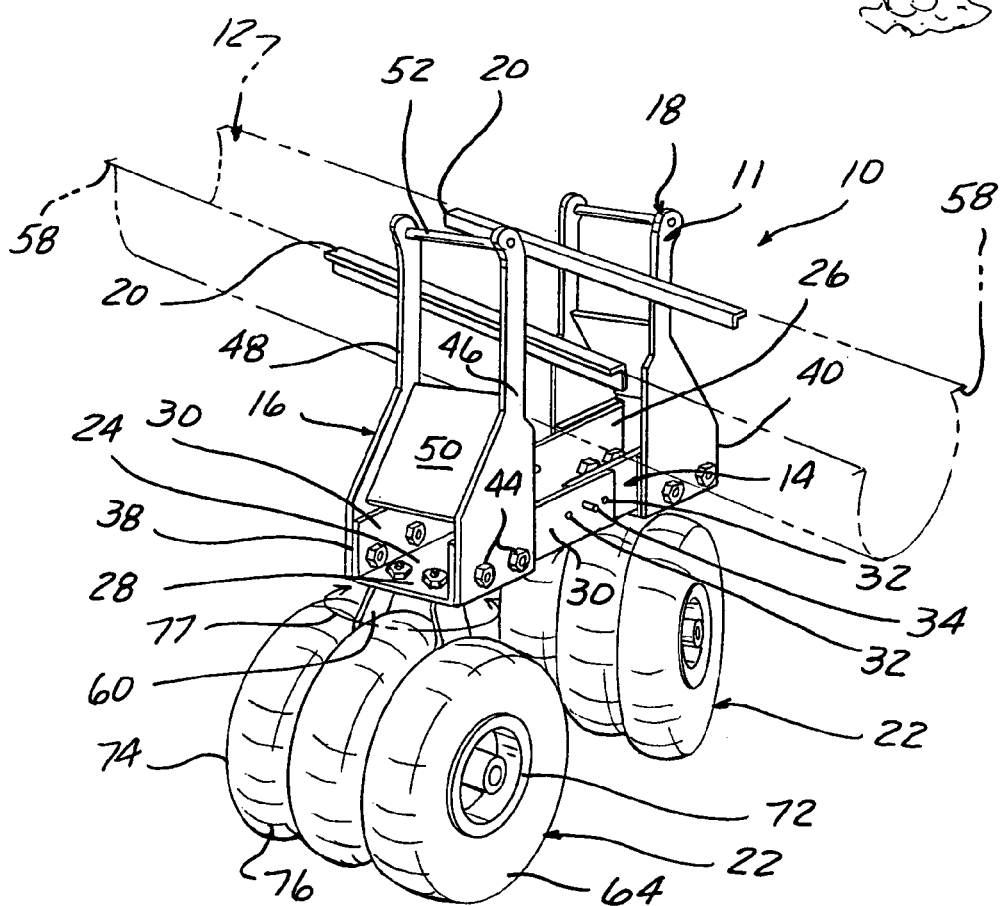
FIG. 2 is a second perspective view of the rollable support for a cement-pouring chute of the present invention showing the cement-pouring chute in phantom line.
Figure 3:
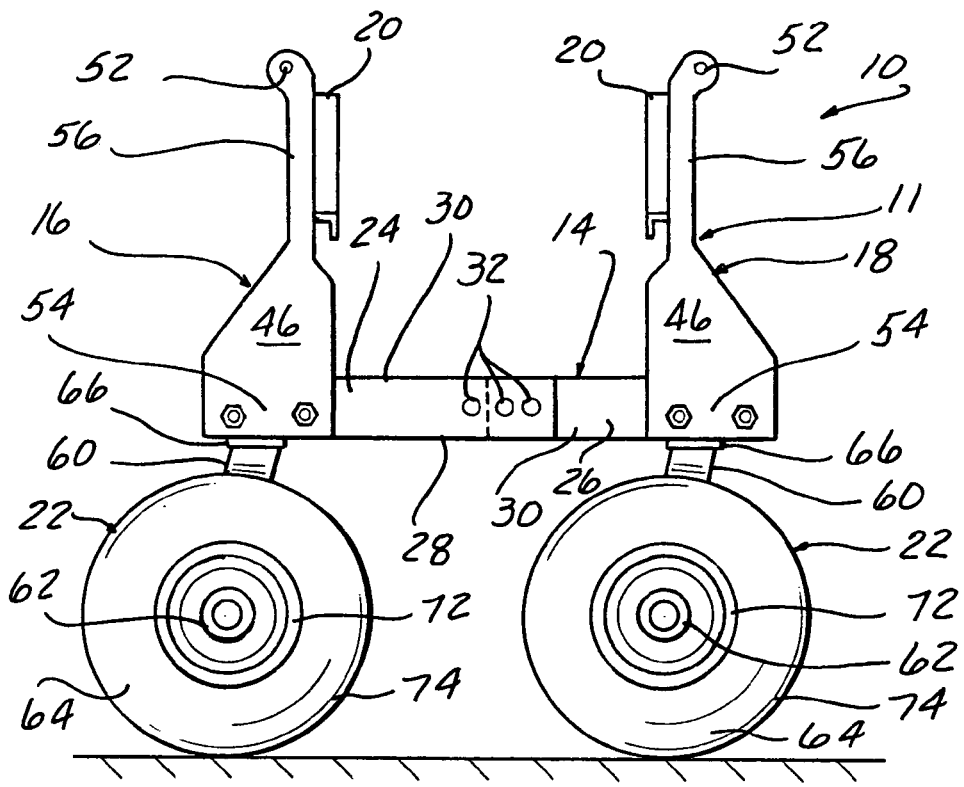
FIG. 3 is a front elevational view of the rollable support for a cement-pouring chute of the present invention.
Figure 4:
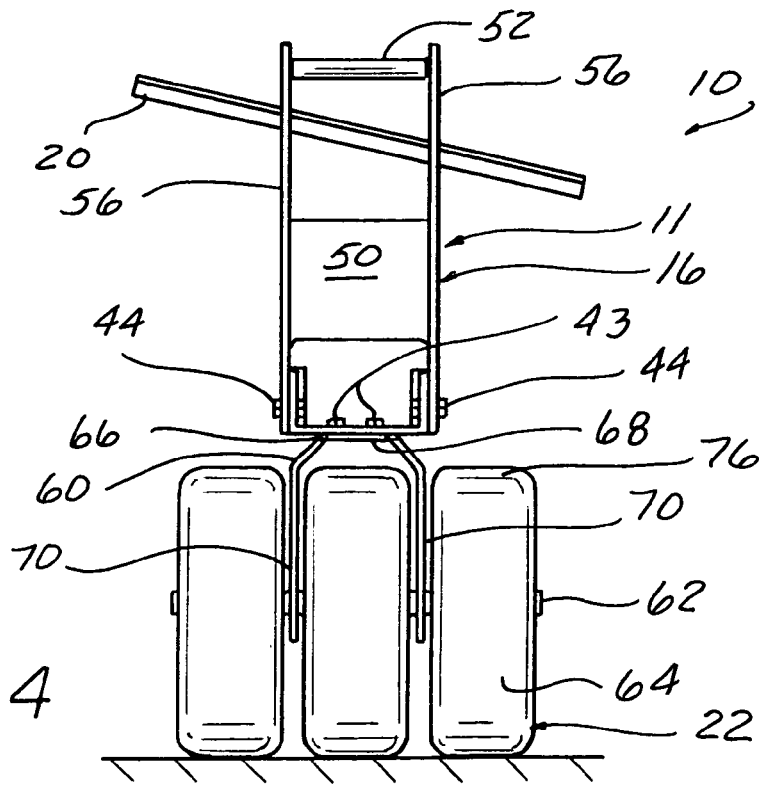
FIG. 4 is a side elevational view of the rollable support for a cement-pouring chute of the present invention.

FIGS. 1–4 illustrate an apparatus 10 for rollably supporting a cement-pouring chute 12 which is coupled to a cement truck (not shown). The cement-pouring chute 12 has a substantially U-shaped cross-section that allows for wet cement 13 to travel along the chute 12 from the cement truck to a pour location. The apparatus 10 of the present invention provides a support structure 11 for cooperatively engaging the cement-pouring chute 12 and directing the pouring of cement 13 to a desired location. The support structure 11 includes a substantially horizontal support 14, a first vertical support 16, a second vertical support 18, and cement-pouring chute support rails 20. Roller assemblies 22 are connected to the support structure 11 to provide a rolling adjustment of the apparatus 10.

In order to support the cement-pouring chute 12 and the cement 13 contained therein, the horizontal support 14 and the vertical supports 16, 18 of the support structure 11 are rigid. The horizontal support 14 may be constructed as a unitary, integral support element, or, alternatively, it may be constructed from two or more sections connected in such a way as to provide a substantially rigid, horizontal support. The horizontal support 14 may be fabricated from steel, aluminum, or other substantially rigid materials. The horizontal support 14 has a first portion 24 and second portion 26, wherein both the first and second portions 24, 26 of the horizontal support 14 each have a base portion 28 and side walls 30 to form a substantially "U"-shaped cross-section. The base portion 28 may be substantially horizontal, and the side walls 30 may be substantially vertical. The base portion 28 and side walls 30 of the first portion 24 of the horizontal support 14 are dimensioned to slidably receive the base portion 28 and the side wall 30 of the second portion 26 of the horizontal support 14 in a telescoping fashion, such that the first portion 24 and the second portion 26 substantially overlap. The first portion 24 and the second portion 26 of the horizontal support 14 provide correspondingly aligned holes 32 in the side walls 30 for receiving releasable fasteners 34. The releasable fasteners 34 allow for the adjustment of the overlap that may exist between the first and second portions 24, 26 of the horizontal support 14. Such a configuration allows for the adjustment of the overall length of the horizontal support 14. The fasteners may include screws, nuts and bolts, bars, locking pins, or the like. Alternatively, overlapping portions of the first and second portions 24, 26 may be permanently fastened through welds, solder, or similar permanent fastening means. When joined, the first portion 24 and the second portion 26 form a substantially rigid and substantially horizontal support 14.

To support the roller assemblies 22 on the horizontal support 14, holes are provided on both the base portion 28 and the side walls 30 near open ends 38 and 40 of the first and second portions 24, 26 of the horizontal support 14. The holes provided in the base portion 28 receive fasteners 42 for connecting the roller assemblies 22 to the horizontal support 14. The fasteners 42 may comprise bolts, screws, or the like. Alternatively, the roller assemblies 22 may be welded to the base portion 28 of the horizontal support 14 near the open ends 38 and 40 of the first and second portions 24, 26 of the horizontal support 14.

To connect the first and second vertical supports 16, 18 to the horizontal support 14, the first and second vertical supports 16, 18 are connected to the open ends of the horizontal support 14 by fasteners 44. Holes are provided in the side walls 30 of the horizontal support 14, as well as in the first and second vertical supports 16, 18, for receiving fasteners 44. The fasteners 44 may be replaced with welding, soldering, or any other means suitable for securing the first and second vertical supports 18 to the horizontal support 14. The first and second vertical supports 16, 18 are formed as substantially mirror images of one another.

Each of the vertical supports 16, 18 is comprised of a front panel 46, a rear panel 48, a brace member 50, and a handle 52. Each of the front and rear panels 46, 48 on the first and second vertical supports 16 and 18 each have a flange portion 54 wherein each is in contact with the horizontal support 14. Each of the front and rear panels 46 and 48 tapers inwardly as it ascends away from the horizontal support 14 and comes to form a substantially straight, vertical riser portion 56. At the uppermost part of the front and rear panels 46 and 48, each riser portion 56 turns slightly outward from the center portion of the apparatus 10. On each of the first and second vertical supports 16, 18, the handle 52 is disposed in the out-turned portion of riser portion 56, spanning the width of the apparatus 10 and connecting each of the front panels 46 to the respective rear panels 48 of the first and second vertical supports 16 and 18. The handles 52 may be connected to the front and rear panels 46 and 48 by any conventional means as may be known in the art, such as screws, bolts, welds, solder, or the like. Additionally, the handles 52 may be removably attached to the front and rear panels 46 and 48 of the first and second vertical supports 16 and 18. The brace member 50 further connects the front and rear panels 46 and 48 of each of the first and second vertical supports 16 and 18 to provide additional stability and rigidity to the first and second vertical supports 16 and 18. The brace member 50 may be bolted, welded, screwed, or otherwise affixed to the front and rear panels 46 and 48. Both of the front panels 46, rear panels 48, brace members 50, and handles 52 may be constructed from any substantially rigid material, such as steel or the like. As an alternative to the substantially fixed structural nature of the first and second vertical supports 16 and 18, it may be desirable to construct riser portions 56 in multiple sections (not shown) and provide lapped or telescoped joints between the sections to allow the overall height of the first and second vertical supports 16 and 18 to be adjusted.

In order to angularly support the cement-pouring chute 12, one cement-pouring chute support rail 20 is provided on each of the first and second vertical supports 16 and 18 of the apparatus 10. The rails 20 extend along the interior portions of riser portions 56 of the first and second vertical supports 16 and 18 and provide an elongated, inverted "L"-shaped portion that traverses the interior portions of the riser portions 56 from the rear panels 48 to the front panels 46 of each of the first and second vertical supports 16 and 18. The rails 20 may be affixed to the first and second vertical supports 16 and 18 through welds, fasteners, or any other means as may be known in the art. Each rail 20 is of a size and orientation adapted to cooperatively engage lip portions 58 of the cement-pouring chute 12. The rails 20 extend rearward of the rear panels 48 and forward of the front panels 46 of the first and second vertical supports 16 and 18 in an amount sufficient to allow the use of fasteners or other attaching mechanisms, such as bolts, clamps, or the like, on the rails 20 to cooperatively engage with the lip portions 58 of the cement-pouring chute 12. Such fasteners are sufficient to prevent slippage between the cement-pouring chute 12 and the rails 20 when the cement-pouring chute 12 is in use.

In an alternative embodiment, the rails 20 are pivotally mounted to the first and second vertical supports 16 and 18 thereby allowing for the adjustability of the angle at which the rails 20 traverse from the rear panels 48 to the front panels 46 of the first and second vertical supports 16 and 18. Such adjustability may be useful in accommodating differing angles of the cement-pouring chute 12 in different cement-pouring environments.

The support structure 11 of the apparatus 10 is rollably supported by the roller assemblies 22 wherein each roller assembly provides a fork 60, an axle 62, wheels 64, and a mounting bearing 66. The top of each fork 60 has a substantially flat portion 68 on which is provided a mounting bearing 66. The mounting bearing 66 is further attached via conventional fasteners 44 to either the first or second end 38 or 40 of the horizontal support 14. The bearing 66 allows for the free rotational movement of the fork 60 relative to the horizontal support 14. Below the flat portion 68 of the fork 60, the fork 60 splits into two branches 70 that descend downward from the horizontal support 14 in a substantially parallel fashion. The distance between the branches 70 of the fork 60 is sufficient to rollably accommodate the width of a wheel 64. An axle 62 is mounted near the bottom most portion of the branches 70 of the fork 60. The axle 62 extends between the branches 70 of the fork 60 and further extends laterally away from the exterior portions of the branches 70 to accommodate the mounting of the wheels 64 exterior to the branches 70 of the fork 60. Three wheels 64 are mounted on the axle 62 in a manner that allows each wheel 64 the independence to rotate at a rate different from each of the other two wheels 64. Each wheel 64 has a hub 72 and a tire 74 that is provided with a tread 76. Both the tire 74 and the tread 76 are suitable for use in a variety of environments, particularly including use on rough, uneven, or substantially unfinished surfaces. The tires 74 may be made of rubber or other material suitable for pneumatic inflation. Alternatively, each wheel 64 may be made of other materials suitable for the rigors of construction work site conditions. The vertical alignment of the axle 62 with respect to the flat portion 68 of the fork 60 is at an angle less than ninety degrees, or somewhat off-center, allowing for the free rotation of the wheel assembly 22 around the mounting bearing 66, as indicated by the arrow 77 in FIG. 2. Such an alignment allows for the substantially caster-like operation of the roller assemblies 22 as the apparatus 10 is maneuvered in operation.

A wide variety of alternative embodiments of the roller assembly 22 may exist, including the use of a different number of wheels 64 or using wheels of different sizes or compositions. Additionally, different roller assemblies 22 may be interchangeable on the horizontal support 14 by removing one roller assembly 22 and attaching a second, different roller assembly 22 through the use of the fasteners 44 on the first or second ends 38 and 40 of the horizontal support 14 which may be removable. Such interchanging may be appropriate when a specific cement-pouring job presents severe uneven terrain, possibly requiring the use of larger diameter wheels 64.

In operation, the apparatus 10 is initially situated at a distance appropriately remote from the cement-pouring source, and an empty cement-pouring chute 12 is aligned with the apparatus 10. The cement-pouring chute 12 is arranged such that the lip portions 58 on either side of the cement-pouring chute 12 rest upon the rails 20 provided on the left and right vertical supports 16 and 18 of the support structure 11. The cement-pouring chute 12 is then fastened to the rails 20 by use of fasteners, such as nuts and bolts, clamps, or the like. Once the cement-pouring chute 12 is appropriately secured to the rollable support apparatus 10 and is otherwise connected to a cement-pouring source, the cement-pouring operation may begin. Whether the cement-pouring chute 12 is manually directed or directed through the use of hydraulic mechanisms connected to the cement-pouring chute 12, the rollable support apparatus 10 allows for the free movement of the cement-pouring chute 12 throughout the course of the pouring operation without the need to cease the pouring operation and empty the contents of the chute 12 in order to direct the chute 12 to a new location. In the event that the cement-pouring chute 12 is provided having a greater or lesser width, the horizontal support 14 may be adjusted in some embodiments to accommodate a cement-pouring chute 12 having a much different width. To achieve this, fasteners 34 in holes 32 provided in the first side portion 24 and the second side portion 26 of the horizontal support 14 may be removed, the portions 24, 26 may be realigned, and fasteners 34 may be reinserted into holes 32. Similarly, other embodiments of the apparatus 10 may provide adjustability of the rails 20 or vertical supports 16 and 18. When the pour is complete, the lip portions 58 of the cement-pouring chute 12 may be disengaged from the rails 20, and the rollable support apparatus 10 may be stowed for future use.

While the invention has been described in connection with what is presently considered to be the most practical embodiments, it is to be understood that the invention is not to be limited to those disclosed embodiments. To the contrary, it is intended to cover various modifications and equivalent arrangements included within the spirit and scope of the appended claims, which scope is intended to be accorded the broadest interpretation so as to encompass all such modifications and equivalent structures as is permitted under the law.

Accordingly, I claim:

1. An apparatus for rollably supporting a cement-pouring chute, comprising:
   a substantially horizontal support having a first end and a second end;
   first and second substantially vertical supports respectively attached to the first and second ends of the horizontal support and extending upwardly therefrom;
   substantially parallel first and second rails respectively attached to the first and second vertical supports and cooperatively engageable with a cement-pouring chute for directing the pouring of cement therefrom; and
   first and second roller assemblies pivotally attached to the horizontal support and having pivotal axes in substantial vertical alignment with the first and second substantially vertical supports, respectively.

2. The apparatus of claim 1, further comprising:
   said roller assemblies each having at least one pneumatic tire.

3. The apparatus of claim 1, further comprising:
   said roller assemblies each having at least one caster.

4. The apparatus of claim 1, further comprising:
   said roller assemblies each having a bearing wherein said bearing is attached to the horizontal support.

5. The apparatus of claim 1, further comprising:
   said horizontal support being adjustable in length.

6. The apparatus of claim 1, further comprising:
   said first and second vertical supports each having a handle.

7. The apparatus of claim 1, further comprising:
   said first and second vertical supports being adjustable in height.

8. The apparatus of claim 1, further comprising:
said first and second rails being angularly adjustable.

9. An apparatus for rollably supporting a cement-pouring chute, comprising:
a substantially horizontal support having a first end, a second end, wherein said horizontal support is adjustable in length;
first and second substantially parallel vertical supports respectively attached to the first and second ends of the horizontal support and extending upwardly therefrom;
said vertical supports each having a handle;
substantially parallel first and second rails attached to the first and second vertical supports respectively and cooperatively engageable with a cement-pouring chute for directing the pouring of cement therefrom; and
a first and second roller assembly connected to the horizontal support.

10. The apparatus of claim 9, further comprising:
said first and second roller assemblies each including a bearing attached to the first and second ends of the horizontal support respectively.

11. The apparatus of claim 9, further comprising:
the horizontal support and vertical supports defining a plane; and
said first and second rails oriented to intersect said plane.

12. The apparatus of claim 9, further comprising:
said first and second rails being angularly adjustable.

13. The apparatus of claim 9, further comprising:
said first and second roller assemblies each having at least one pneumatic tire.

14. The apparatus of claim 9, further comprising:
said first and second roller assemblies each having at least one caster.

15. The apparatus of claim 9, further comprising:
said first and second vertical supports each being adjustable in height.

16. An apparatus for rollably supporting a cement-pouring chute, comprising:
a substantially horizontal support having a first end, a second end, and an adjustable length;
first and second substantially vertical supports respectively attached to the first and second ends of the horizontal support and extending upwardly therefrom;
substantially parallel first and second rails respectively attached to the first and second vertical supports and cooperatively engageable with a cement-pouring chute for directing the pouring of cement therefrom; and
at least one roller assembly attached to the horizontal support.

17. An apparatus for rollably supporting a cement-pouring chute, comprising:
a substantially horizontal support having a first end and a second end;
first and second substantially vertical supports respectively attached to the first and second ends of the horizontal support and extending upwardly therefrom;
said first and second end vertical supports each having a handle;
substantially parallel first and second rails respectively attached to the first and second vertical supports and cooperatively engageable with a cement-pouring chute for directing the pouring of cement therefrom; and
at least one roller assembly attached to the horizontal support.

18. An apparatus for rollably supporting a cement-pouring chute, comprising:
a substantially horizontal support having a first end and a second end;
first and second substantially vertical supports respectively attached to the first and second ends of the horizontal support and extending upwardly therefrom;
said first and second vertical supports being adjustable in height;
substantially parallel first and second rails respectively attached to the first and second vertical supports and cooperatively engageable with a cement-pouring chute for directing the pouring of cement therefrom; and
at least one roller assembly attached to the horizontal support.

19. An apparatus for rollably supporting a cement-pouring chute, comprising:
a substantially horizontal support having a first end and a second end;
first and second substantially vertical supports respectively attached to the first and second ends of the horizontal support and extending upwardly therefrom;
substantially parallel first and second rails respectively attached to the first and second vertical supports and cooperatively engageable with a cement-pouring chute for directing the pouring of cement therefrom;
said first and second rails being angularly adjustable; and
at least one roller assembly attached to the horizontal support.

* * * * *

UNITED STATES PATENT AND TRADEMARK OFFICE
CERTIFICATE OF CORRECTION

PATENT NO. : 6,966,415 B1
DATED : November 22, 2005
INVENTOR(S) : Dennis Conrad

It is certified that error appears in the above-identified patent and that said Letters Patent is hereby corrected as shown below:

Column 3,
Line 27, delete "support." and insert -- support 14. --;

Column 4,
Line 1, delete "ends of" and insert -- ends 38 and 40 of --;
Line 7, delete "18" and insert -- 16, 18 --; and
Line 22, delete "out-tumed" and insert -- out-turned --.

Signed and Sealed this

Thirty-first Day of January, 2006

JON W. DUDAS
*Director of the United States Patent and Trademark Office*